Sept. 14, 1937.　　　V. A. BOWMAN　　　2,093,229
MOTOR VEHICLE
Filed July 24, 1936　　　2 Sheets-Sheet 2
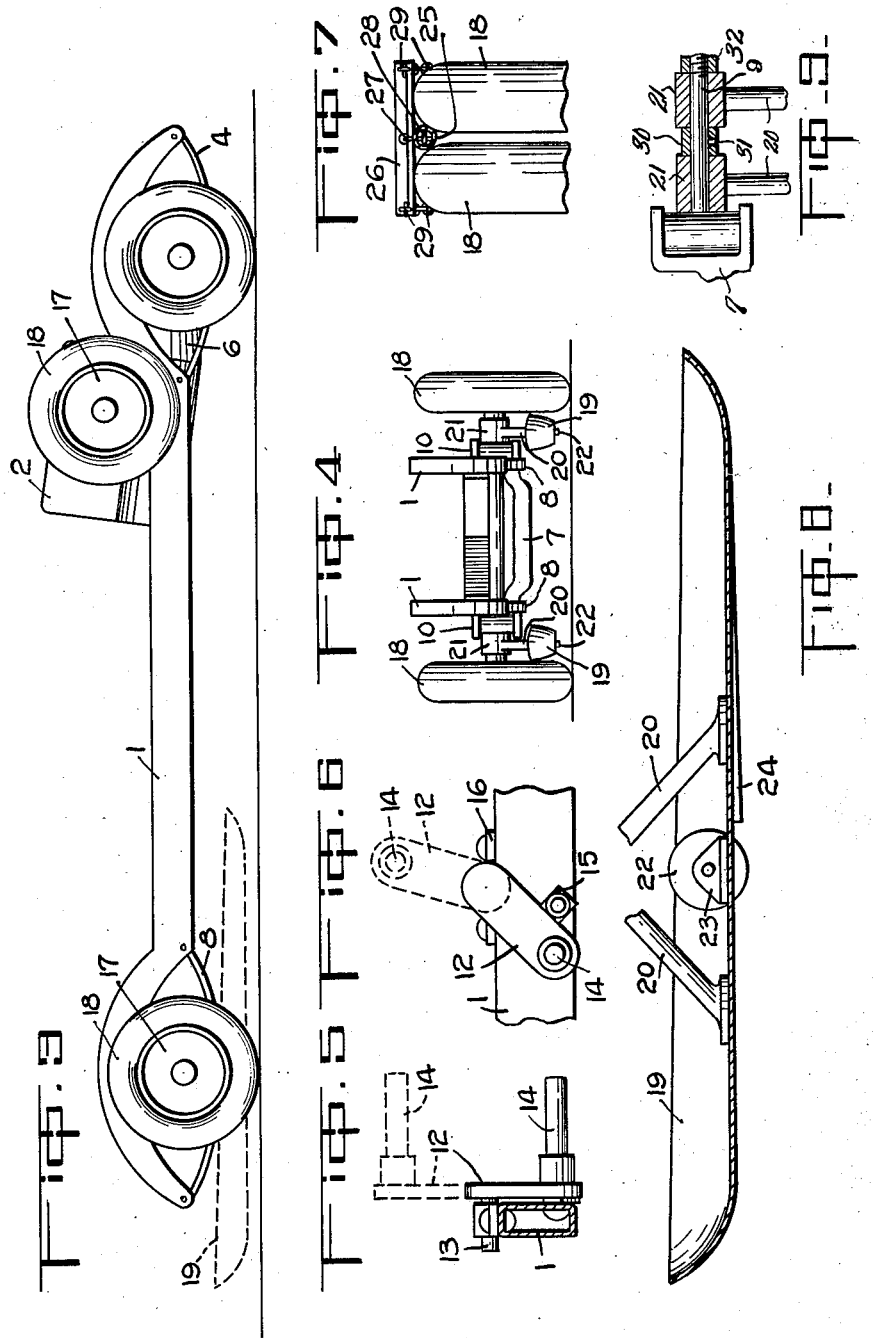
Inventor
V. A. BOWMAN
By J. E. M. Fetherstonhaugh
Attorney Patented Sept. 14, 1937

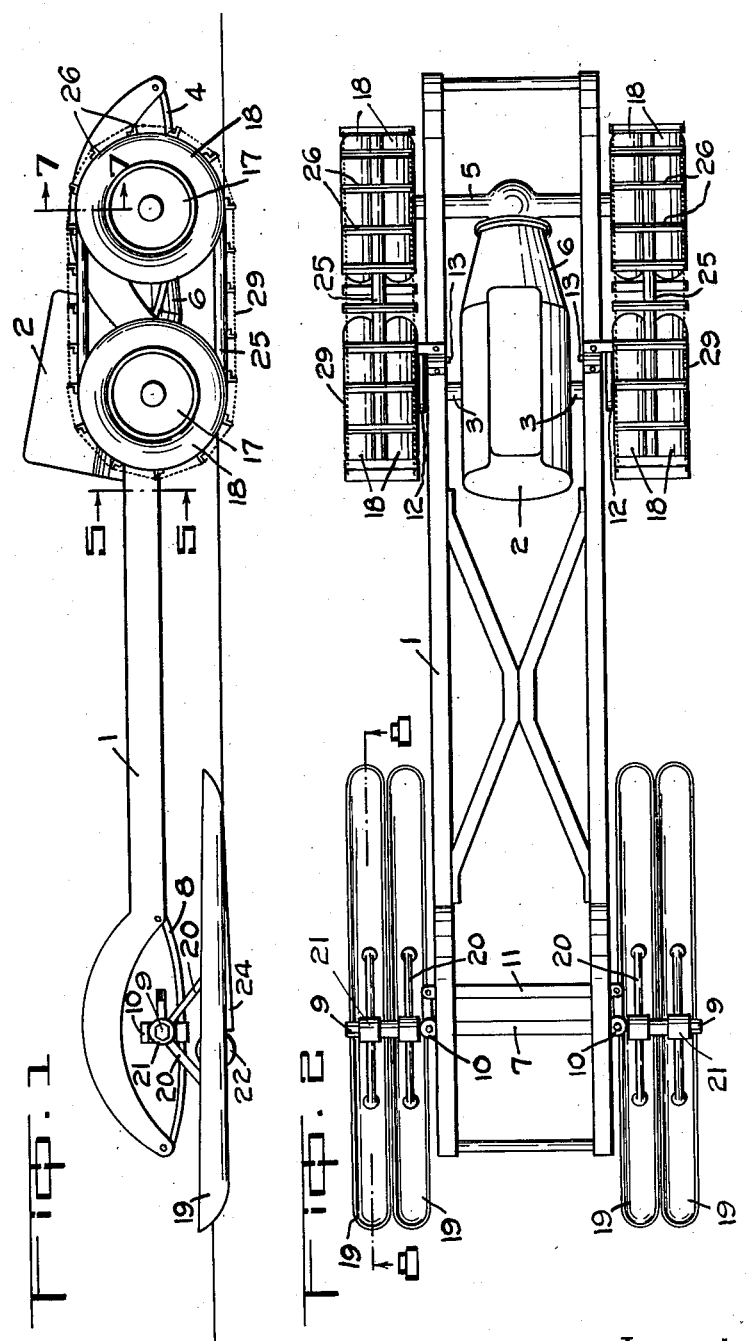

2,093,229

UNITED STATES PATENT OFFICE 2,093,229

MOTOR VEHICLE

Vern Asa Bowman, Thornloe, Ontario, Canada

Application July 24, 1936, Serial No. 92,395
In Canada April 6, 1936

3 Claims. (Cl. 180—5)

My invention relates to improvements in motor vehicles, and an object of my invention is to devise a motor vehicle equipped with orthodox wheels conventionally disposed for use on bare roads in summer which may be alternatively repositioned and used in conjunction with endless crawler tracks and skis for use on snow covered ground in winter, and on which alternatively both wheels and skis may be positioned at the same time to adapt the vehicle for use over ground which may be either snow covered or bare as is the case in the spring or fall seasons.

Another object of my invention is to provide such a motor vehicle in which duplicate pairs of wheels and duplicate pairs of skis are provided, one pair each of the wheels and skis being spaced standard automobile tread width and one pair being spaced standard sleigh runner width, so that the vehicle is adapted to travel over roads which have been rutted by either automobiles or sleighs without its path being confined to that of the ruts.

Yet another object is to provide a motor vehicle wherein the motor is disposed above a pair of driving wheels and wherein journal means are provided for a second pair of wheels which are adapted to serve alternatively as idler wheels for carrying crawler tracks belted to the driving wheels when the vehicle is to be used on snow covered ground or as conventional spare wheels for the vehicle when it is used on bare ground.

A still further object of my invention is to devise novel types of skis and crawler tracks for a vehicle adapted to be used on snow-covered ground.

With the above and other objects in view which will hereinafter appear as the specification proceeds, my invention consists, in its preferred embodiment, of the construction and arrangement all as hereinafter more particularly described and illustrated with reference to the accompanying drawings, in which:

Fig. 1 is a side elevational view of my improved motor vehicle as equipped for travelling over snow-covered ground;

Fig. 2 is a plan view thereof;

Fig. 3 is a side elevational view of my vehicle as equipped for travelling over bare ground and showing in broken lines the position occupied by skis which may be used when the vehicle travels over ground which may be alternatively bare and snow-covered;

Fig. 4 is an elevational view of the front end of my vehicle as equipped for travelling over ground which may be alternatively bare and snow-covered;

Fig. 5 is an enlarged detail vertical sectional view, taken along the line 5—5 of Fig. 1, showing one of the swingable idler wheel journal supports in position for belting the idler wheel to the driving wheel, the alternative position of the journal support being shown in broken lines;

Fig. 6 is an enlarged detail side elevational view of the idler wheel journal support shown in Fig. 5;

Fig. 7 is a vertical cross-sectional view taken along the line 7—7 of Fig. 1 through one of the crawler tracks used on my vehicle for travelling over snow-covered ground;

Fig. 8 is an enlarged longitudinal sectional view through one of the skis used on my vehicle, taken along the line 8—8 of Fig. 2; and Fig. 9 is an enlarged detail view of one of the forward wheel or ski journals of the vehicle showing in vertical section a means for positioning either wheels or skis thereon.

Like characters of reference designate corresponding parts in the different views.

Referring to the drawings, my motor vehicle includes a frame 1 of conventional construction, in the rear of which a motor 2 is mounted. The motor is preferably vertically swingable on pivot bearings 3 on the frame connected to the forward end of the motor, the rearward end of the latter floating on springs 4 connected to the frame and to a driving axle housing 5 carried by the transmission housing 6 of the motor. The forward end of the frame is provided with an axle 7 carried by springs 8 connected to the frame, such axle having wheel or ski journals 9 swingable on conventional steering knuckles 10 simultaneously operable for steering by a rod 11 which may be connected to a steering wheel or the like (not shown).

On the frame 1 forwardly of the axle housing 5 a pair of arms 12 are provided which are swingable on pivots 13 secured to the frame, and from the free ends of which wheel journals 14 extend transversely. Stops 15 are adapted to position such arms with the journals 14 on a horizontal line with the axle in the housing 5, as shown in full lines in Figs. 5 and 6, and stops 16 to position the arms in an upwardly and rearwardly swung position as indicated by the broken lines in such figures for a purpose which will hereinafter become apparent.

Wheels 17, eight in number and preferably of conventional disc type provided with low pressure pneumatic tires 18, are required for the vehicle, as well as four skis 19. Such skis are preferably of elongated boat shape and each is secured to struts 20 radiating from a bearing 21 in which a journal 9 may be received. Each journal 9 is adapted to receive the bearings 21 of a pair of the skis, spaced apart by means such as a collar 30 provided with a set-screw 31, and secured against displacement by means such as a nut 32 on the free end of the journal, or alternatively to receive the bearing 21 of one ski and the hub bearing of one of the wheels 17, or to receive a single ski or a single wheel. Similarly each journal 14 and each driving axle is provided with means such as the collar 30 whereby either one or two wheels may be positioned thereon. The lengths of the struts 20 are such that the vertical distance from the axis of the bearing 21 to the lower surface of the ski is appreciably less than the outer radius of a tire 18.

Each ski also may be provided with an auxiliary wheel 22 journalled in brackets 23 on the upper surface of the ski and adapted to project partially through and run freely in a slot in the bottom of the ski. A tapered flange 24 may also be provided on the lower surface of the ski longitudinally disposed rearwardly of the wheel 22, the maximum depth of the flange 24, which is at the end of the flange adjacent the wheel, being substantially less than the distance which the wheel 22 projects from the lower surface of the ski, and decreasing from such point to the rear of the ski.

When the vehicle is to be used on snow-covered ground, one pair of wheels 17 is attached to each end of the driving axle in the housing 5 and one pair is positioned on each of the journals 14, and the two pairs of wheels on opposite sides of the vehicle belted together with a crawler track as shown in Figs. 1 and 2. Such track may comprise an endless resilient belt 25 of tubular section, as best illustrated in Fig. 7, adapted to lie between and frictionally engage the side walls of the tires 18, and to which transverse traction members 26 of right angular cross-section which engage the treads of the tires are secured intermediately of their ends by links 27 passing through the wall of the belt 25 and attached to an endless chain 28 disposed in the bore of the belt. The members 26 are maintained at right angles to the belt 25 by means of chains 29 joining adjacent ends of the members.

To adapt my vehicle for use over snow covered ground, one pair of skis is positioned on each of the journals 9, one pair of wheels is attached to each end of the driving axle, a pair of wheels is positioned on each of the journals 14 with the latter positioned as shown in the full lines of Figs. 5 and 6, and then the crawler tracks are belted between the pairs of wheels on each side of the vehicle. It should be noted that the mountings for the wheels and skis are so disposed that the longitudinal centre lines of the inner wheels and skis are spaced a distance equal to standard sleigh runner spacing, and that the longitudinal centre lines of the outer wheels and skis are spaced a distance equal to standard automobile tread spacing.

When the vehicle is to be used over ground which may be alternately snow-covered or bare, the crawler tracks are removed from the wheels, the arms 12 are swung upwardly against the stops 16 to bring the wheels on the journals 14 out of contact with the ground, and the outer ski of each pair is removed from the journals 9 and replaced by one of the inner wheels removed from the driving axle. When thus equipped, the vehicle is propelled over either snow or bare ground by the driving wheels, and on bare ground the front of the vehicle rides on the wheels on the journals 9, such wheels projecting below the skis so that the latter are clear of the ground; when travelling over snow the inner skis provide additional support for the front of the vehicle. If desired, of course, one of each pair of wheels from the journals 14 may be used to replace the skis, leaving the dual wheels on the driving axle to provide greater traction for the vehicle.

When the vehicle is to be used for driving over bare ground only, the inner skis used for both snow covered and bare ground are removed, and one wheel only is used on each end of the driving axle, in the outermost position, leaving the vehicle equipped as a conventional automobile.

When the vehicle is equipped as above for use on snow only, the auxiliary wheels 22 permit the vehicle to be driven over a bare surface, such as a garage floor, for short distances without injuring the skis, and such wheels and flanges 24 also cut into the snow and assist in steering the vehicle by preventing lateral slippage of the skis when the latter are turned at an angle to the longitudinal axis of the vehicle.

An advantage of my improved motor vehicle is that, by virtue of the weight of the engine being disposed over the driving wheels, the tractive effort obtained is a maximum for the amount of power expended by the motor.

A further advantage is that by the use of the double sets of wheels and skis any tendency of the vehicle to become caught in ruts in a surface travelled by other vehicles is eliminated.

Yet another advantage of my improved construction is that it provides a vehicle which can be adapted very easily and with a minimum of extra parts for use either in heavy snow or on bare highways without losing in either case any of the advantages of the conventional automobile.

What I claim as my invention is:

1. In a motor vehicle, a frame, a motor disposed in the rear thereof, a transversely disposed rear axle driven by the motor, a front axle including a pair of journals swingable on steering knuckles, a pair of idler wheel journals mounted on the frame forwardly of the rear axle, a pair of independently removable wheels on each end of the rear axle, a pair of independently removable wheels on each idler wheel journal, a pair of independently removable skis on each front axle journal, a pair of endless crawler tracks adapted to belt each pair of wheels on the rear axle to the corresponding pair of idler wheels, and means for alternatively positioning the idler wheel journals in line with the rear axle and the front axle for belting the wheels on the rear axle to the idler wheels, and in a position above the line joining the rear and front axles for carrying the idler wheels free of connection with the rear axle wheels.

2. A motor vehicle as claimed in claim 1, wherein the outer wheels of each pair and the outer skis of each pair are spaced standard automobile tread spacing, and the inner wheels of each pair and the inner skis of each pair are spaced standard sleigh runner spacing.

3. A motor vehicle as claimed in claim 1 wherein the means for alternatively positioning each idler wheel journal comprises an arm pivoted at one end to the frame and having the journal positioned in its free extremity, and stop means for positioning the arm with the journal in each of the alternative positions.

VERN ASA BOWMAN.